(12) United States Patent
Larson (10) Patent No.: US 9,840,897 B2
(45) Date of Patent: Dec. 12, 2017

(54) HYDRAULIC FRACTURING SYSTEM AND METHOD

(71) Applicant: Kevin Larson, East Liberty, OH (US)

(72) Inventor: Kevin Larson, East Liberty, OH (US)

( * ) Notice: Subject to any disclaimer, the term of this patent is extended or adjusted under 35 U.S.C. 154(b) by 0 days.

(21) Appl. No.: 14/389,181

(22) PCT Filed: Mar. 15, 2013

(86) PCT No.: PCT/US2013/032337
§ 371 (c)(1),
(2) Date: Sep. 29, 2014

(87) PCT Pub. No.: WO2013/148342
PCT Pub. Date: Oct. 3, 2013

(65) Prior Publication Data
US 2015/0083235 A1    Mar. 26, 2015

Related U.S. Application Data (60) Provisional application No. 61/616,312, filed on Mar. 27, 2012.

(51) Int. Cl.
*E21B 43/34*    (2006.01)
*E21B 43/40*    (2006.01)
(Continued)

(52) U.S. Cl.
CPC ............ *E21B 43/26* (2013.01); *E21B 43/34* (2013.01); *E21B 43/40* (2013.01); *F28B 1/02* (2013.01);
(Continued)

(58) Field of Classification Search
CPC ...... E21B 43/34; E21B 43/40; E21B 43/2405; E21B 43/26; E21B 43/267; B01D 5/0036;
(Continued)

(56) References Cited

U.S. PATENT DOCUMENTS 1,723,637 A * 8/1929 Williams ...................... 165/113
2,944,966 A * 7/1960 Eickmeyer ............. B01D 1/065
                                                    159/13.3

(Continued)

FOREIGN PATENT DOCUMENTS

WO    WO 2011014107 A1    2/2011
WO    WO 2011072252 A2    6/2011

OTHER PUBLICATIONS

CIVE 1400: "Fluid Mechanics and Properties of fluids", Available online at: http://www.efm.leeds.ac.uk/CIVE/CIVE1400/PDF/Notes/section1.pdf.*

*Primary Examiner* — In Suk Bullock
*Assistant Examiner* — Jonathan Pilcher (57) ABSTRACT

Disclosed herein is a fracturing unit for hydraulic fracturing having an engine and a fracturing pump connected to the engine through a variable speed torque converter. Also disclosed is a hydraulic fracturing system using multiple fracturing units which are sized similar to ISO containers. A hydraulic fracturing system may also force flow back water, produced water, or fresh water through a heat exchanger so that heat from the fracturing engines can be transferred to these liquids in order to vaporize them. A force cooled fractioning unit then can accept the vapor/steam in order to condense the various components and produce distilled water for re-use in the fracturing process or for release into the environment.

18 Claims, 9 Drawing Sheets

(51) Int. Cl.
*B01D 5/00* (2006.01)
*F28B 1/00* (2006.01)
*F28B 1/02* (2006.01)
*E21B 43/26* (2006.01)
*F28D 7/16* (2006.01)
*E21B 43/24* (2006.01)
*F28D 21/00* (2006.01)

(52) U.S. Cl.
CPC ......... *F28D 7/1623* (2013.01); *F28D 21/001* (2013.01); *B01D 5/006* (2013.01); *B01D 5/009* (2013.01); *B01D 5/0009* (2013.01); *B01D 5/0036* (2013.01); *B01D 5/0081* (2013.01); *E21B 43/2405* (2013.01); *F28B 1/00* (2013.01); *F28D 2021/0059* (2013.01); *Y10T 137/6579* (2015.04)

(58) Field of Classification Search
CPC .... B01D 5/0003; B01D 5/006; B01D 5/0006; F28B 1/00; F28B 1/02; F28B 1/06; F28D 7/0075; F28D 7/085; F28D 7/08; F28D 9/0056
USPC .................................. 165/117, 159
See application file for complete search history.

(56) References Cited

U.S. PATENT DOCUMENTS

| | | | |
|---|---|---|---|
| 4,139,596 A * | 2/1979 | Vaseen | C01B 17/775 204/174 |
| 5,508,574 A * | 4/1996 | Vlock | B60K 6/445 310/113 |
| 7,037,430 B2 | 5/2006 | Donaldson | |
| 7,513,972 B2 | 4/2009 | Hart | |
| 7,842,121 B2 | 11/2010 | Sanderson | |
| 8,097,128 B1 | 1/2012 | Sherry | |
| 8,158,097 B2 | 4/2012 | Ditommaso | |
| 2007/0201305 A1* | 8/2007 | Heilman | E21B 21/062 366/141 |
| 2007/0277982 A1* | 12/2007 | Shampine et al. | 166/308.1 |
| 2008/0078552 A1* | 4/2008 | Donnelly et al. | 166/303 |
| 2008/0182699 A1 | 7/2008 | Salvaire | |
| 2009/0082906 A1 | 3/2009 | Sanderson | |
| 2009/0120635 A1 | 5/2009 | Neal | |
| 2009/0236088 A1* | 9/2009 | Davis | F28D 7/1607 165/274 |
| 2010/0000508 A1 | 1/2010 | Chandler | |
| 2010/0078167 A1 | 4/2010 | Bunger | |
| 2010/0095661 A1 | 4/2010 | Hemphill | |
| 2010/0125044 A1 | 5/2010 | Keister | |
| 2010/0193448 A1 | 8/2010 | Mcguire | |
| 2010/0307753 A1 | 12/2010 | Rey | |
| 2011/0005999 A1 | 1/2011 | Randal | |
| 2011/0042320 A1 | 2/2011 | Allen | |
| 2011/0100924 A1 | 5/2011 | Duesel | |
| 2011/0127027 A1* | 6/2011 | Kashirajima et al. | 165/286 |
| 2011/0233143 A1 | 9/2011 | Mcguire | |
| 2011/0253634 A1 | 10/2011 | Soane | |
| 2012/0048717 A1* | 3/2012 | Frick | 203/22 |
| 2012/0255734 A1* | 10/2012 | Coli | E21B 43/26 166/305.1 |

* cited by examiner

HYDRAULIC FRACTURING SYSTEM AND METHOD

CROSS-REFERENCE TO RELATED APPLICATIONS

This application claims priority to U.S. application Ser. No 61/616,312 filed on Mar. 27, 2012 and is herein incorporated by reference in its entirety.

TECHNICAL FIELD

Embodiments generally relate to systems and method related to hydraulic fracturing, specifically those that increase efficiency, and recycle the FBW and/or PW.

BACKGROUND OF THE ART

The process of hydraulic fracturing oil and gas wells produces industrial wastes referred to as Flow-back Water (FBW initial return) and Produced Water (PW long term return). Millions of gallons of regurgitated FBW/PW, per drill site, contain chemicals and other contaminates brought to the surface of the earth which need to be rendered harmless and disposed of. The O&G industry is searching for new ways to minimize the usage of Fresh Water (FW) being withdrawn from the environment which has increased the interest in recycling of the waste waters. Many methods have been developed but all have drawbacks to some degree; high cost per barrel, mediocre quality outcomes, low production rates. Recycling is being used to minimize the draw of fresh water from the environment, and to minimize the amount of contaminates needing to be disposed of.

The existing technology for the treatment and/or disposal of FBW/PW is extremely expensive and is not environmentally friendly. The current practice causes damage to the public's infrastructure from mass transportation of FBW/PW from the drill site and fresh water to the site, damage to the environment from spills and contamination, and earthquakes from FBW/PW being disposed of in injection wells. All the transporting of both fresh water and FBW/PW adds carbon footprint and greenhouse gases.

The practice of driving a fracturing pump with a transmission has inherent drawbacks; sudden load applications, up-shifting problems, horsepower losses through the transmission resulting in more fuel consumption, flow degradation due to less than optimal pump speeds and over torque possibilities in low gears damaging equipment.

Open fracturing rigs submit the environment to leak/spill possibilities of the engine fluids and massive spills of the chemically treated fresh water fracturing fluid at high pressure/flow entering the well head from the innumerous hoses, fittings and couplings. These items cause a large footprint on a small space and lend to a very dangerous work environment. The open rigs cause over burdening noise levels to the public also.

Some recycling systems are too slow processing low volumes of water and consuming more energy across the board. Some methods render usable low quality water but fluctuations in salinity and chemicals create hardships treating water for re-use. Other methods clean the water well but are left with larger amounts of waste such as dirty filters still needing processed or disposed of. Utilizing a transmission the pump flow is marginalized as the transmission has horse power losses through itself and is not an exact match for maximizing the speed and flow from the pump.

FBW/PW treatment generally is not performed on site during fracturing, but is done after the fracturing is completed with other types of equipment. This is an additional expense, another contractor and equipment on the drill site and more energy is consumed. Disposal at permitted facilities is very expensive, requires trucking and separate from the fracturing process. Disposal is also performed injecting FBW/PW into wells contaminating the earth and causing earthquakes. Utilizing a transmission to drive a fracturing pump causes quick hard loading of the engine resulting in killing the engine when coming on line against a high pressure manifold potentially causing damage to all components. Pump sets are traditionally open frame mounted and leaks can be strewn on the ground easily from the engine, transmission and the fracturing pump itself. Open units also cause a very high ambient noise level on the drill site and surrounding environment.

SUMMARY OF THE EXEMPLARY EMBODIMENTS

Exemplary embodiments provide a fracturing unit for hydraulic fracturing having an engine and a fracturing pump connected to the engine through a variable speed torque converter. Exemplary embodiments also provide a hydraulic fracturing system using multiple fracturing units which are sized similar to ISO containers. A hydraulic fracturing system may also force flow back water, produced water, or fresh water through a heat exchanger so that heat from the fracturing engines can be transferred to these liquids in order to vaporize them. A force cooled fractioning unit then can accept the vapor/steam in order to condense the various components and produce distilled water for re-use in the fracturing process or for release into the environment.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
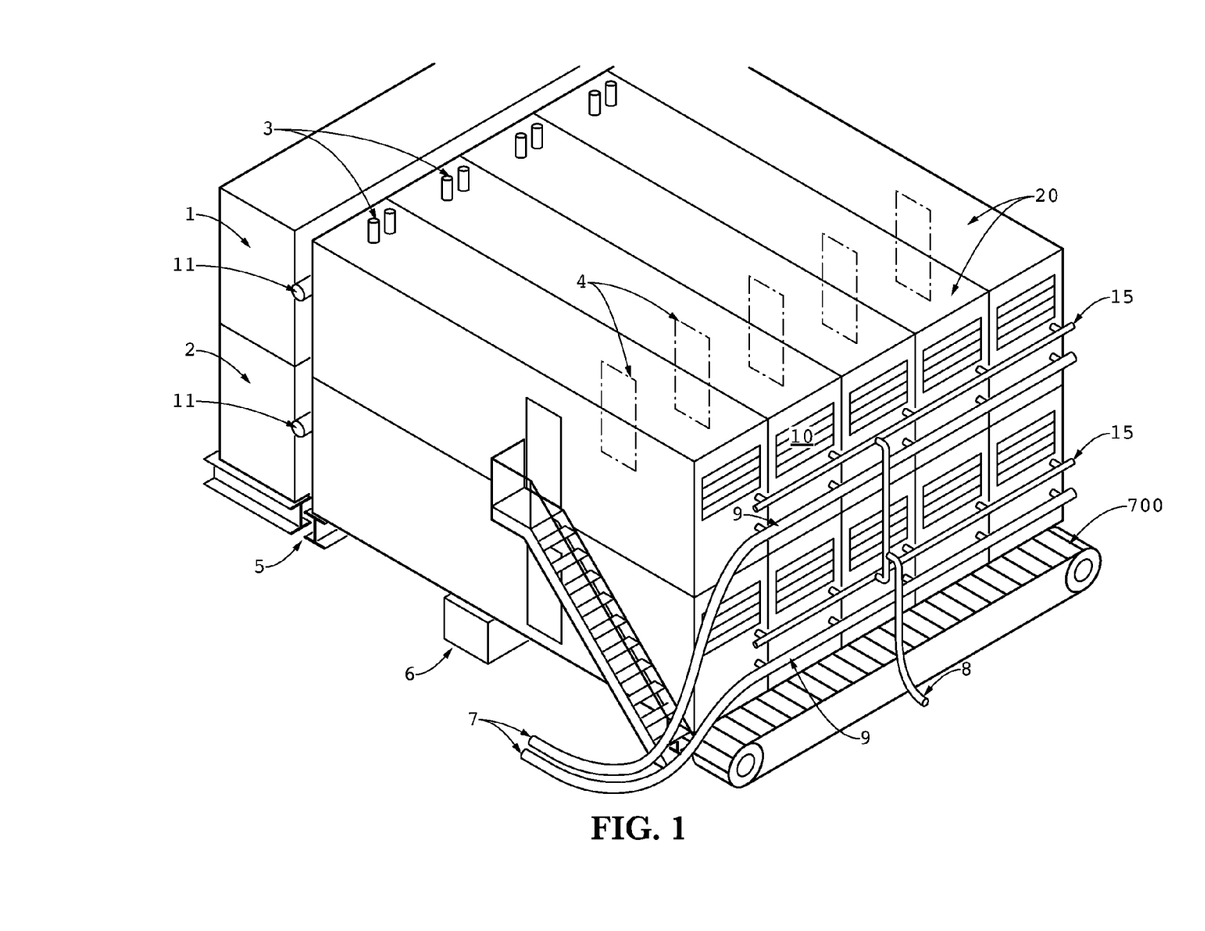
FIG. 1 is a perspective view of an exemplary embodiment of a hydraulic fracturing system (HFS).

FIG. 1 is a perspective view of an exemplary embodiment of a hydraulic fracturing system (HFS). This embodiment of the HFS embodies the employment of ISO shipping containers to house all of the related equipment (Fleet Equipment, FE) required to perform the act of hydraulic fracturing of an oil or gas well. The containers allow stacking of the FE, causing the well pad footprint to be minimized reducing the environmental impact of the fracturing process. A plurality of fracturing units 20 are positioned in close proximity to one another. It is preferable that each fracturing unit 20 fits within an ISO container or an enclosure which has dimensions similar to an ISO container (also known commonly as an intermodal container, freight container, hi-cube container, conex box, and sea can). In this way, they can be stacked atop one another and next to each other. Each embodiment may require more or less fracturing units 20, but in this particular embodiment a total of ten fracturing units 20 are used. A plurality of access doors 4 are aligned with one another and allow access into each fracturing unit 20. Each fracturing unit 20 also preferably contains an intake portion for accepting ambient air, here represented by louvers 10.

A foundation 5 may be set on the site prior to installing the fracturing units 20, and here the foundation 5 is designed for H beams, but could also be done with I beams, concrete, gravel, or other rigid materials that would prevent settling of the underlying earth. Fracturing units 20 may also set on track systems 700 enabling standard engine fleets that are radiator cooled to be mounted in the containers making them mobile to move well to well requiring very little teardown/setup, such as may be required for zipper fracs that contain a single wellhead on the pad. It is preferable for a single fuel tank 6 to be used which supplies fuel to each of the fracturing units 20, as this allows for single fill port to minimize the risk of fuel spillage. It is preferable that the fuel tank 6 contains NFPA spill containment. Engine exhaust apertures 3 allow engine exhaust to escape, and could be positioned anywhere, but are preferably located on the top of and near the end of the fracturing unit 20.

Fracturing pump suction lines 7 are preferable fed from a mixer (described more below) and connect to the suction or low pressure (LP) manifold 9 which supplies each fracturing unit 20. The suction line 7 hoses preferably supply pump sets with fracturing fluid from the sand and chemical blenders. Another manifold 15 accepts the resulting pressurized fracturing fluid and sand from each fracturing unit 20 and collects this into a single fracturing fluid/sand supply 8 for the well head. A steam manifold 11 may collect the steam from each fracturing unit 20 and direct it to an optional steam turbine or may direct it to the FCFU for fractioning and condensing. An absorption chiller and/or steam turbine 1 is preferably placed in close proximity to the fracturing units 20, as well as a horizontal forced cooling fractioning unit 2. An absorption chiller may use the engine exhaust to cool heated water whereby controlling the temperature of the distilled water before entrance into the storage tanks or the well.

Figure 2:
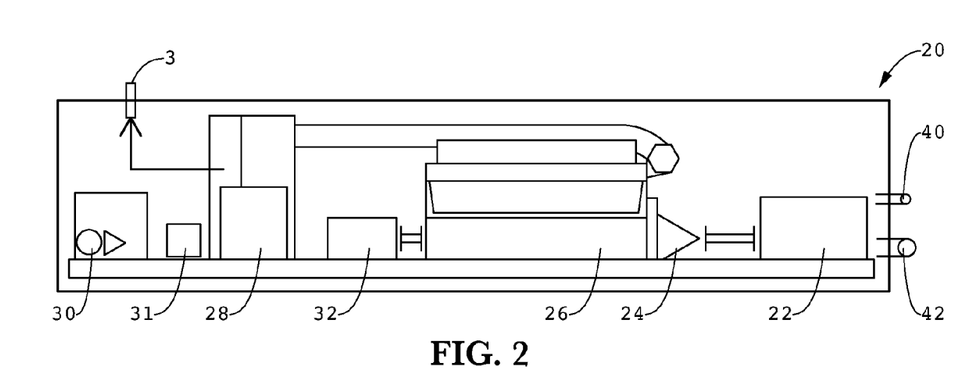
FIG. 2 is a side view of an exemplary embodiment of a fracturing unit.
Figure 3:
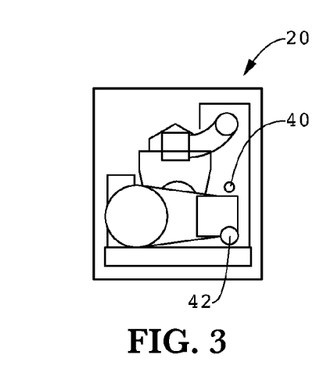
FIG. 3 is a front view of an exemplary embodiment of a fracturing unit.
Figure 4:
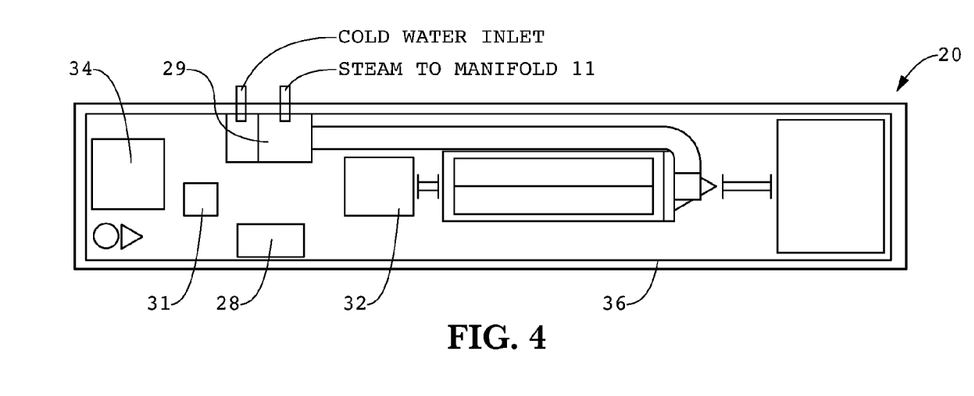
FIG. 4 is a top view of an exemplary embodiment of a fracturing unit.

FIG. 2 is a side view of an exemplary embodiment of a fracturing unit 20. FIG. 3 is a front view of an exemplary embodiment of a fracturing unit 20. FIG. 4 is a top view of an exemplary embodiment of a fracturing unit 20.

A fracturing pump 22 is preferably in fluid communication with an outlet 40 which connects to the manifold 15, as well as an inlet 42 which connects to the manifold 9. The fracturing pump 22 receives fracturing fluid from inlet 42. The fracturing pump 22 is powered by the engine 26 which is preferably connected to the pump 22 through a variable speed torque converter (VSTC) 24, but could also be connected through a traditional transmission. However, the VSTC 24 is preferred as it would allow the engine 26 to run at the most efficient speed for the engine 26 without being forced into a specific speed due traditional transmission requirements, maximizing the efficiency of the engine 26.

The engine 26 is preferably cooled using a tube and shell heat exchanger 28, supplied with FW/FBW/PW supplied by cooling water pump 30. After the fluids have picked up rejected heat from the engine 26, fluids will be directed to a second 2-stage engine exhaust heat exchanger (EEHE) 29 where fluids will be heated to near boiling temperature in the first stage where it can be used for many applications such as fracturing fluid temperature conditioning, directing it to FW storage to prevent freezing, or directed into the second stage of the EEHE 29 for distillation. A gas module 31 may supply natural gas, LPG, hydrogen, or bio gasses of any type supplementing the diesel to the engines whereby reducing the use of diesel by up to 80% reducing emissions and fuel costs. The fracturing unit 20 and its components described herein preferably fits within an ISO container enclosure 36.

An AC generator 32 is also preferably connected to the engine 26. The AC generator 32 may be used to power up all FE during fracturing (electric motors driving blenders, water pumps, sand conveyors, etc and may also be used to power electric water heaters 34 to maximize the purification process during fracturing, or may be used to increase purification rates by using the full capacity of the engine/generator while the well is being serviced and the fracturing pump is not needed. This embodiment also contains a variable speed pump 30 as well as a water heater 34, which could be powered by a natural gas burner or could contain electric heating elements and powered by one of the generators described herein, most preferably the AC generator 32. The pump 30 is preferably in fluid communication with water being forced through the heat exchangers 28 and 29 which is used to cool the engine 26. If necessary, the hot water is then pushed by the pump 30 into the water heater 34 and then exhausted through the steam manifold 11.

Figure 5:
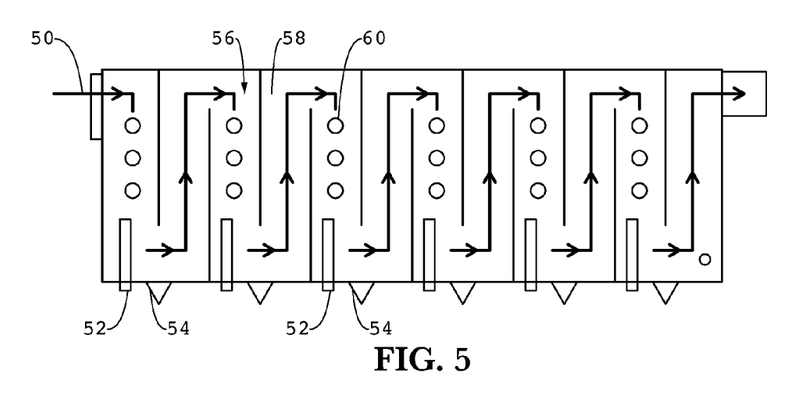
FIG. 5 is a side view of an exemplary embodiment of the forced cooling fractioning unit.

FIG. 5 is a side view of an exemplary embodiment of the forced cooling fractioning unit (FCFU) 2. The FCFU, being designed to differing specifications, sizes and applications, will receive vapors from the distillation process, fractioning off water, petroleum products and each chemical at inherent properties to be recovered for reuse. The FCFU may also be used in different industries such as coal mining recycling mine water run-off, bio-fuel fractionation or any process requiring fractionation. Together with engines, a process of Combined Heat and Power (CHP) can be employed with the FCFU to maximize savings for fractionation processes. The FCFU will preferably supply steam and chemical vapors from the distillation process through steam manifolds 11 to steam inlet 50, proceeding through each cooling segment of differing sizes whereas cooling tubes 60 of differing sizes, cooling vapors incrementally, condensing them for drainage through segment drain 54. A temperature sensing device 52 that will be used by a controller controlling water pump 30 feeding cool FW/FBW/PW to manifold assemblies 62 directing the fluids through tubes 60 thereby cooling the vapors, simultaneously picking up heat to increase the efficiency/flow rate of the distillation process.

Steam which has been collected by the steam manifold 11 is directed into the inlet 50. The steam then passes through a plurality of condenser sections, each one having a falling/cooling section 56 followed by a rising section 58. Within each cooling section, one or more cooling tubes 60 contains FW/FBW/PW and cools the steam. As each vapor component of the steam condenses, it is captured by a condensate drain 54 and collected. A temperature probe 52 may be placed at the bottom of each falling/cooling section 56 and is used in a control system to regulate the flow of coolant through the cooling tubes 60 for that section.

Figure 6:
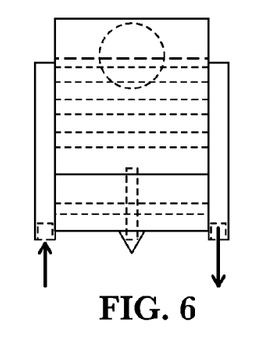
FIG. 6 is a front view of an exemplary embodiment of the forced cooling fractioning unit.
Figure 7:
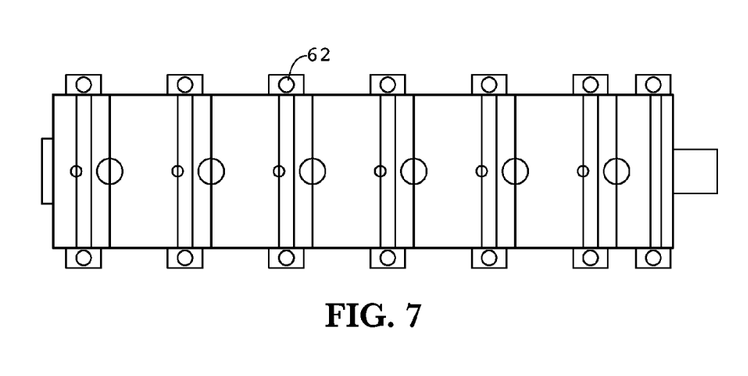
FIG. 7 is a top view of an exemplary embodiment of the forced cooling fractioning unit.

FIG. 6 is a front view of an exemplary embodiment of the forced cooling fractioning unit 2. FIG. 7 is a top view of an exemplary embodiment of the forced cooling fractioning unit 2. A coolant manifold 62 may be used in each section directing coolant into each cooling tube 60 for that section.

Figures 8, 9:
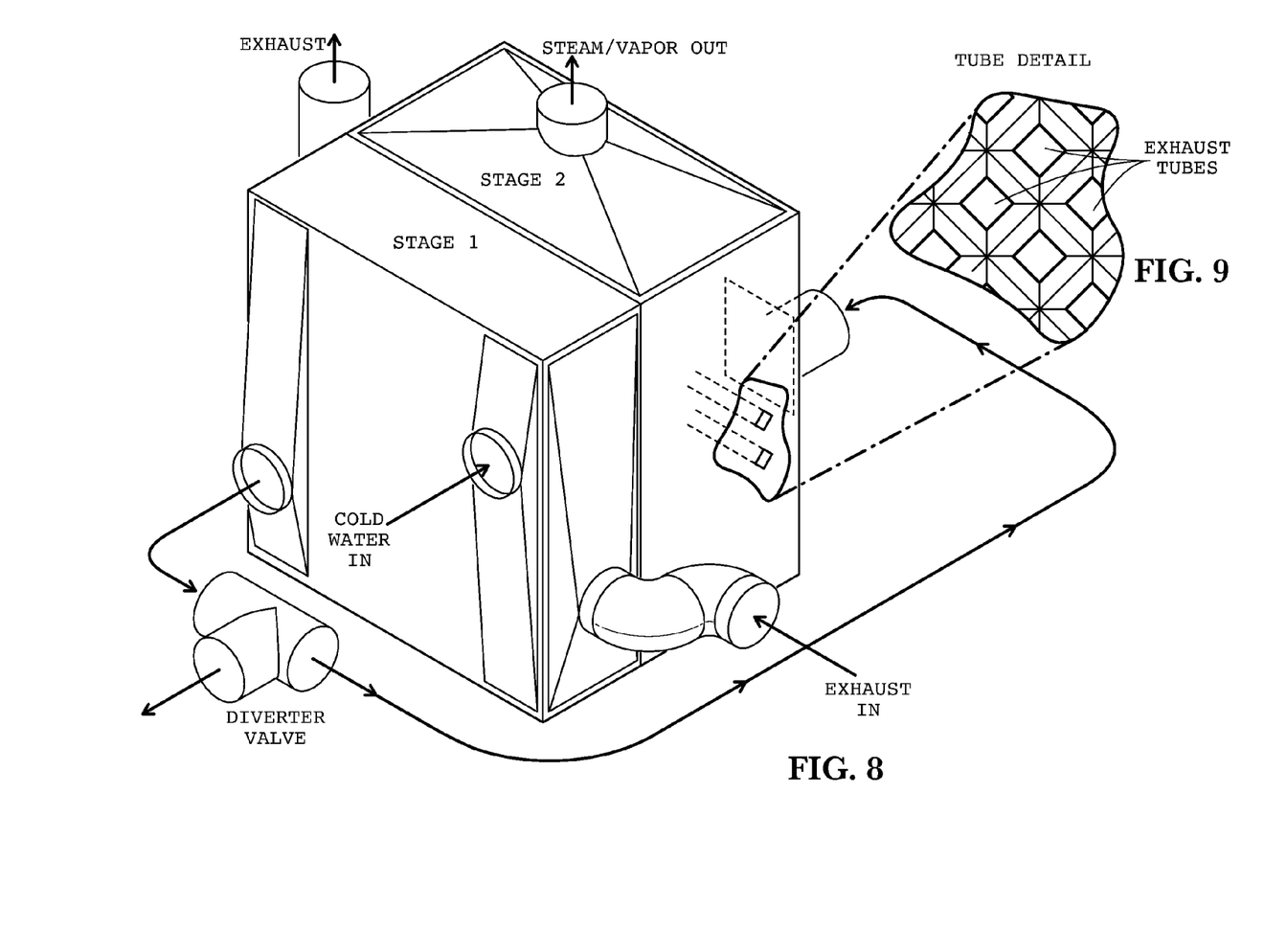
FIG. 8 is a perspective view of an exemplary embodiment of the engine exhaust heat exchanger (EEHE).
FIG. 9 is a detailed view of the exhaust tubes within an exemplary embodiment of the engine exhaust heat exchanger.

FIG. 8 is a perspective view of an exemplary embodiment of the engine exhaust heat exchanger (EEHE) 29. The EEHE 29 will allow flexibility for usage of the heated fluids on the well site whereas it may be used in standard engine/pump sets to provide BTU to heat fracturing fluids before well injection, or prevent freezing of FW in cold climates. As depicted, flexibility is offered but maximizing BTU efficiency increasing the purification flow rates is desired by raising the fluid temperature to just below vaporization in stage 1 whereas most of the exhaust can be directed through the adjustable valve increasing flow rates, with very little exhaust heat required to flash distill the fluids in stage 2. Stage 2 will encase a basin for the highly concentrated salt slurry to be captured and pumped to the PCU 100. Crystallized contaminates will also be removed by vibration or sonic waves from the exhaust tubes into the salt slurry to be processed within the PCU 100.

FIG. 9 is a detailed view of the exhaust tubes within an exemplary embodiment of the engine exhaust heat exchanger. This figure provides detail of the entry point for the exhaust tubes, designed to minimize backpressure for the engine exhaust requirements.

Figures 10, 11:
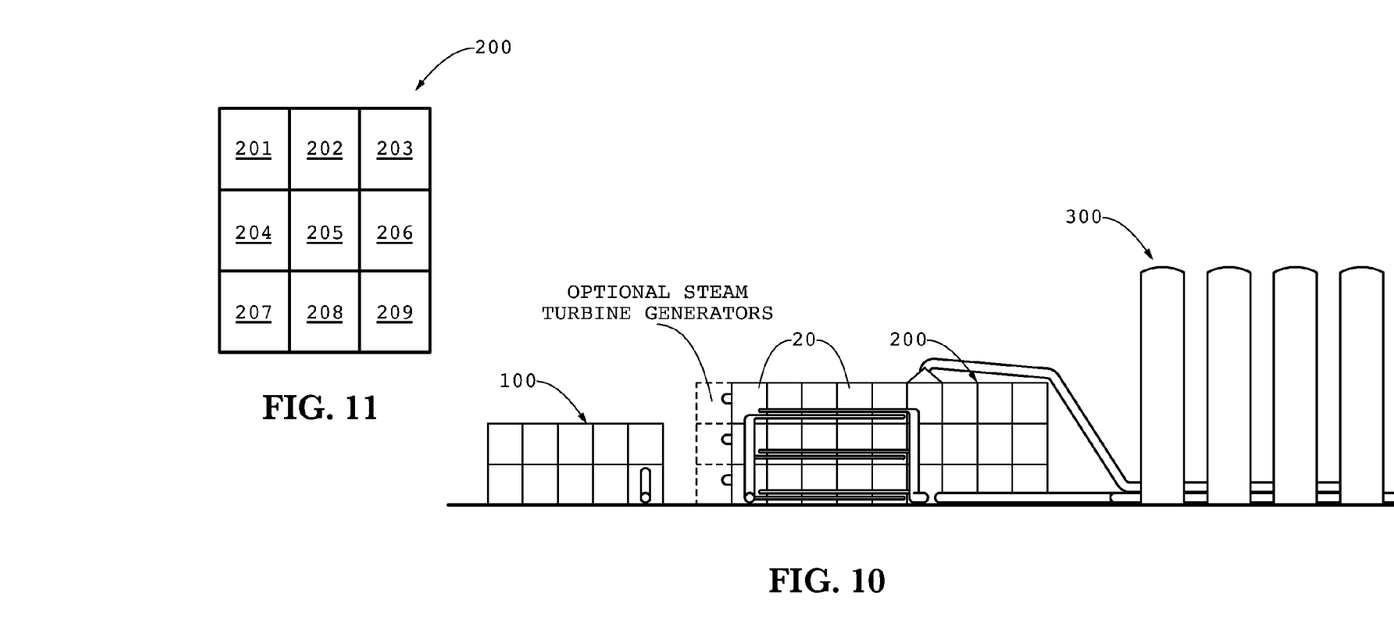
FIG. 10 is a side view of an exemplary embodiment for a fracturing and flow back water treatment system.
FIG. 11 is a side view of an exemplary embodiment for an operations unit.

FIG. 10 is a side view of an exemplary embodiment for a fracturing and flow back water treatment system. A preparation and completion unit 100 is shown alongside the fracturing units 20 with optional steam turbine generators. An operations unit 200 is also shown with a plurality of holding tanks 300. Again, the use of containers similar to ISO containers allows for stacking which can shrink the FE footprint to around ⅕ of an acre or less.

FIG. 11 is a side view of an exemplary embodiment for an operations unit 200. In this embodiment, the operations unit 200 preferably contains the following: a control module and laboratory 201; an electrical control room 202 which can be an electrical distribution module supplying over current protection whereas it receives electrical current from the electrical generator 32 of each fracturing unit 20 distributing and providing control of each pump system, conveyor system, chemical and sand blenders etc; a nitrogen generator 203, a tool room and optional hydrogen generator 204, an optional office for a geologist/chemist 205, an optional fuel tank 206, an acid/chemical blender 207, a hydration unit 8, and a pump module 9. All of these elements 201-209 are also preferably contained within an ISO container or an enclosure which has dimensions similar to an ISO container.

Figure 12:
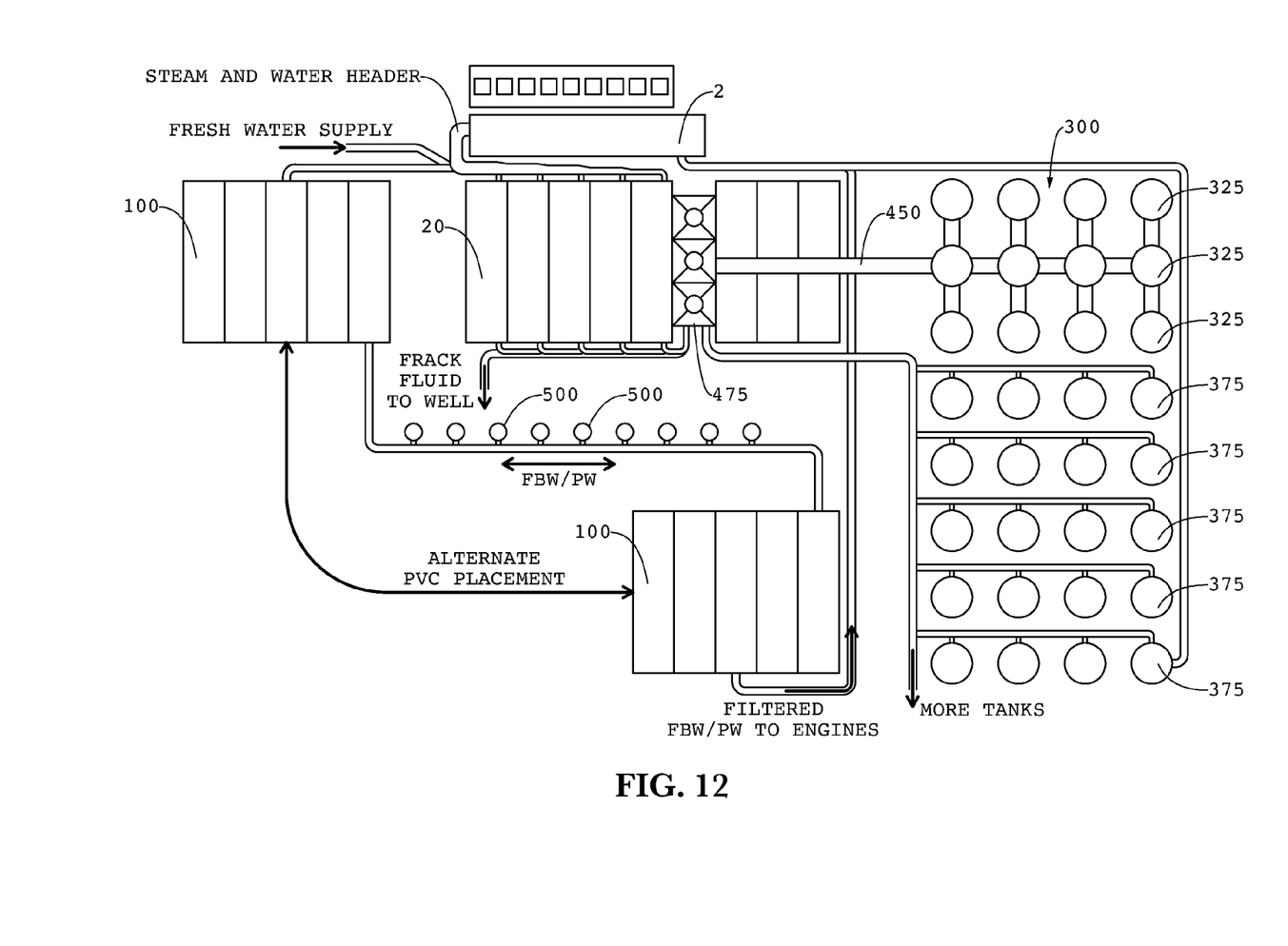
FIG. 12 is a top view of an exemplary embodiment for a fracturing and flow back water treatment system.

FIG. 12 is a top view of an exemplary embodiment for a fracturing and flow back water treatment system. Again here, the FCFU 2 is placed close to the fracturing units 20. The preparation and completion unit (PCU) 100 may be placed on either side of the wellheads as it may remain for months after the fracturing process is completed to continue to purify the FBW/PW flowing from the wells after fracturing is completed. The sand blender 475 module may be placed beside the fracturing units 20 and is being supplied by the sealed sand conveyor 450 sand tanks 325 for sand supply. Distilled water tanks 375 may provide storage of distilled water upon completion of purification. The wellhead string and piping 500 may carry FBW/PW and gas to the PCU 100 for treatment.

Figure 13:
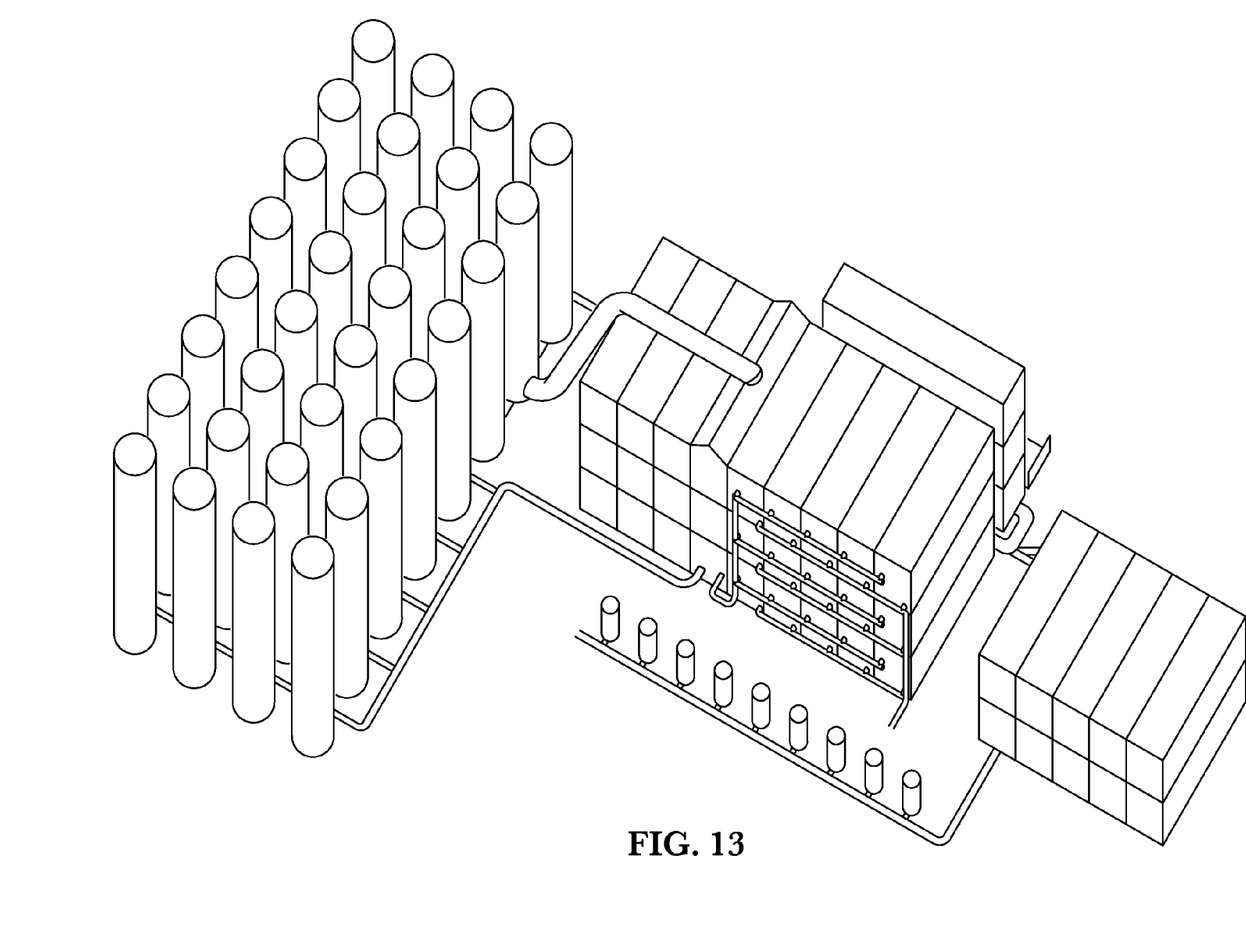
FIG. 13 is a perspective view of an exemplary embodiment for a fracturing and flow back water treatment system.

FIG. 13 is a perspective view of an exemplary embodiment for a fracturing and flow back water treatment system.

Figure 14:
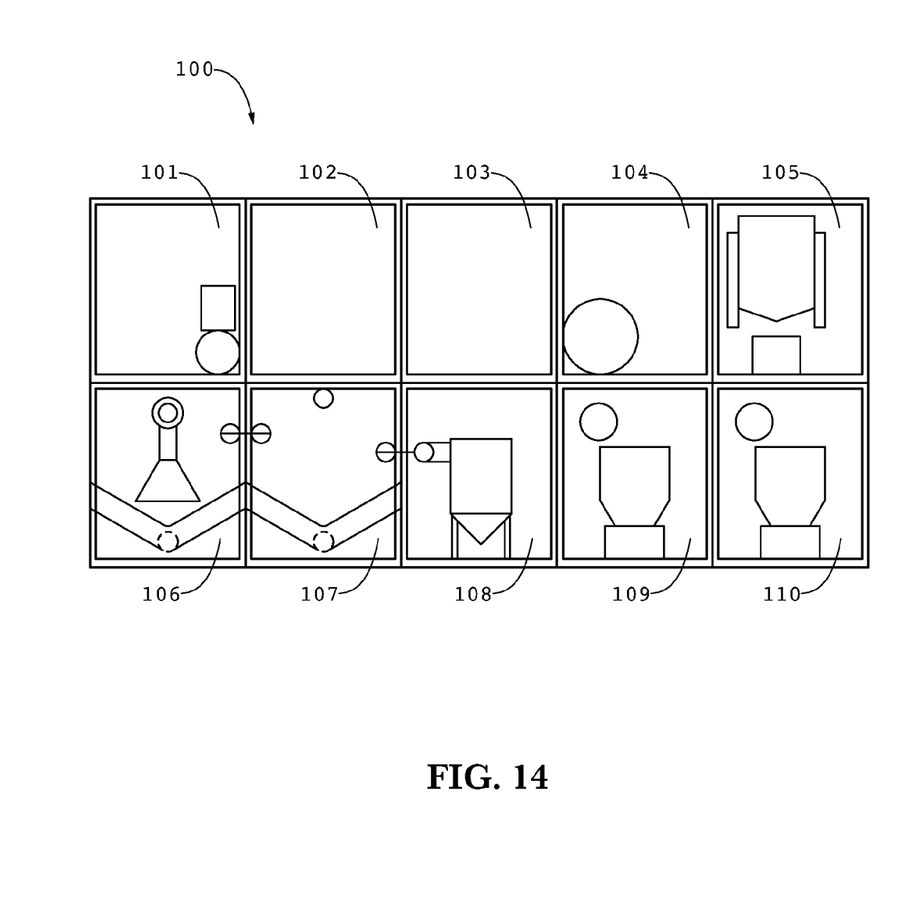
FIG. 14 is a front view of an exemplary embodiment for a preparation and completion unit.

FIG. 14 is a front view of an exemplary embodiment for a preparation and completion unit (PCU) 100. A sulfur dioxide scrubber and gas compressor 101 may clean the natural gas of the FBW/PW before the NG is delivered to the engines 26 to supplement the diesel fuel. Feeding the engines 26 with NG from tank 31 will also prevent raw methane from entering the atmosphere and put the methane to a productive use instead of flaring. A vessel 102 may store NG before entering the sulfur dioxide scrubber and gas compressor 101 for treatment. The PCU 100 may also contain a control module 103 for the PCU 100, which controls and monitors the process. A salt slurry holding tank and a de-mineralization unit 104 may prepare for final completion of the recycling process. A smaller FCFU 105 may handle the flow rates of the PCU 100 with chemical holding tanks below it. The initial sealed tanks 106 may accept the FBW/PW so that sand will settle out of the fluid withdrawing the sand from the rear of the tank for recapture and use in the fracturing process. The tank 106 may incorporate a slanted v-shaped bottom to direct the sand to the outlet and may have a raised outlet to control fluid level, whereas the fluid will then enter a second tank 107 to then settle out large suspended solids being withdrawn from the rear of the tank to be hauled off for possible further treatment and disposal. Tank 107 may also use an outlet whereby directing the fluid to centrifuge 108 for further removal of small suspended solids by centrifuge before delivering the cleaned water to the engines for engine cooling and purification. Diesel or gas engine/generator sets 109 and 110 may supply power to the well site for completion activities and to supply heat for the completion unit 100. The amount of generator sets may vary as the PCU 100 may be used as a temporary central processing facility in order to purify FBW/PW from other sites for the well developer or as a service for other developers without the exemplary embodiments herein, thereby lowering the cost of disposal for them and preventing injection back into the earth via class II injection wells. The PCU 100 may also be on site prior to fracturing but during drilling activities providing site power while recycling drilling muds.

Figure 15:
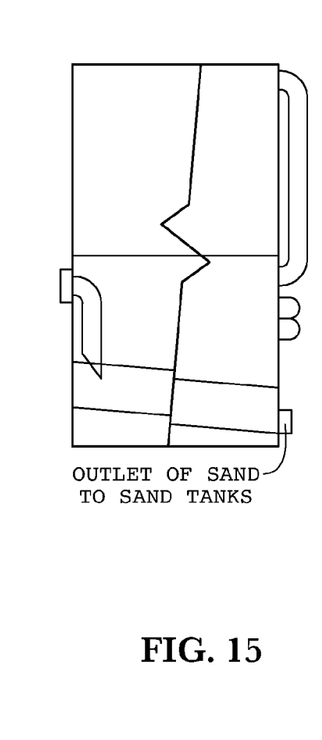
FIG. 15 is a side view of an exemplary embodiment for a preparation and completion unit.

FIG. 15 is a side view of an exemplary embodiment for a preparation and completion unit.

Figure 16:
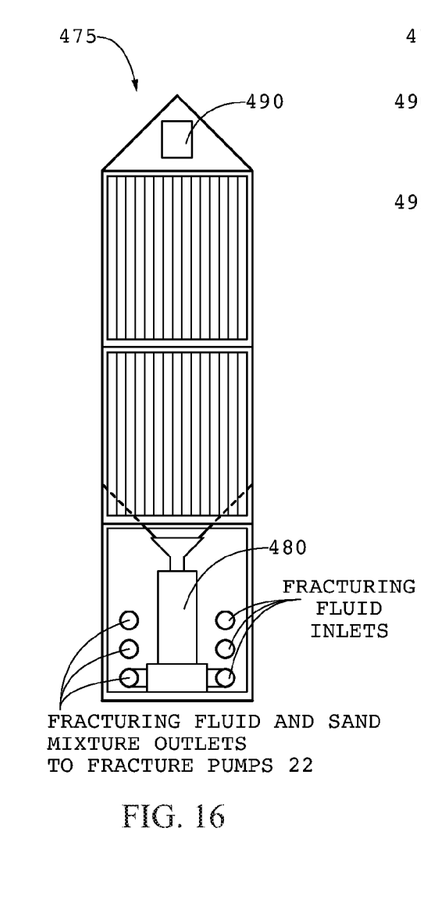
FIG. 16 is a side view of an exemplary embodiment for a sand hopper and blending unit.
Figure 17:
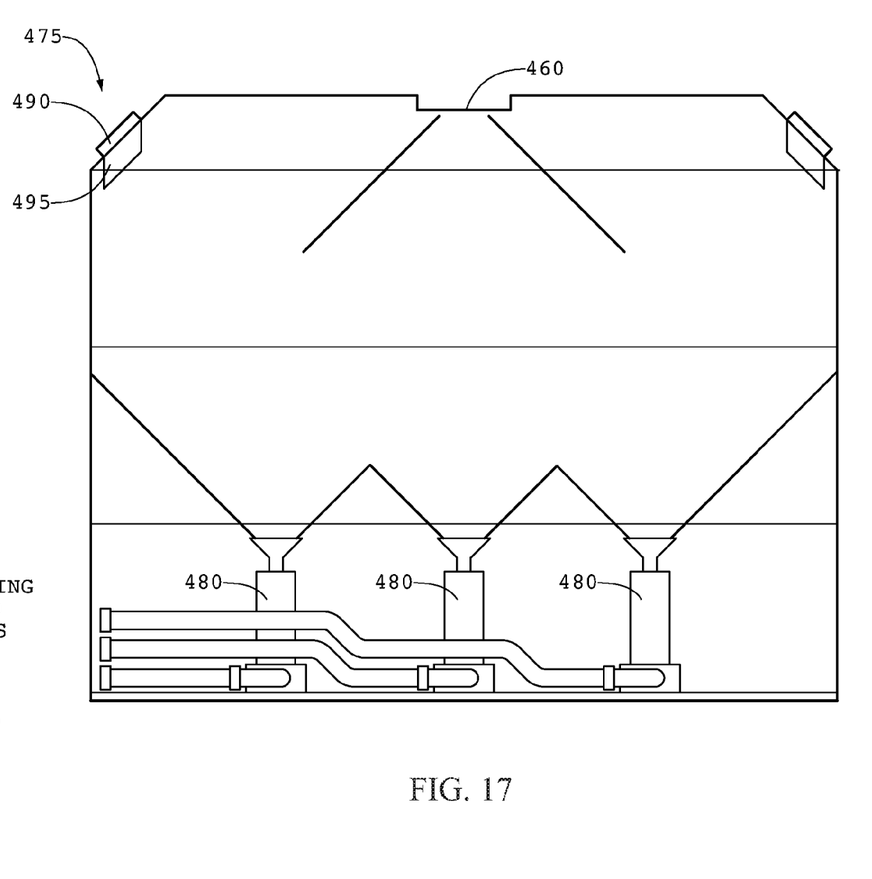
FIG. 17 is a front view of an exemplary embodiment for a sand hopper and blending unit.

FIG. 16 is a side view of an exemplary embodiment for a sand hopper and blending unit 475. FIG. 17 is a front view of an exemplary embodiment for a sand hopper and blending unit 475.

The sand is brought in through the sand conveyor entrance 460 at the top of the sand hopper and blending unit 475. The sand is dropped from the entrance 460 into the sand blending pumps 480 where the sand is mixed with the fracturing fluid entering one side of the module, moving through the blending pumps 480, and exiting on the other side of the module for delivery to the fracturing pumps 22. A pair of suction fans 490 may be used to create a vacuum that will pull air out of the unit 475 and 450 paired with a dust filter 495 to remove particulate that may be airborne, especially silica dust. The filters 495 may be cleaned by vibration, dropping the dust back into the sand.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

I claim:

1. A hydraulic fracturing system comprising:
a plurality of fracturing units, each unit comprising:
an engine,
a fracturing pump operatively connected to the engine,
a low pressure inlet operatively connected to the fracturing pump and configured to supply the fracturing pump with fracturing fluid,
a high pressure outlet operatively connected to the fracturing pump and configured to receive a pressurized fracturing fluid therefrom,
and a heat exchanger which accepts exhaust from the engine and transfers heat from the engine exhaust to Flow Back Water and Produced Water (FBW/PW) from a well to produce vapor comprising vaporized water and chemicals;
a low pressure manifold operatively connected to the low pressure inlets on each fracturing pump;
a high pressure manifold operatively connected to the high pressure outlet on each fracturing pump;
a single conduit operatively connected to the high pressure manifold and configured to supply the pressurized fracturing fluid to a well head;
a single fuel tank configured to supply fuel to each of the plurality of engines;
a manifold configured to collect the vapor produced within each fracturing unit; and
a Forced Cooling Fractionation Unit (FCFU) comprising a plurality of condenser sections wherein each condenser section has alternating cooling section and rising section and a condensate drain positioned at the bottom of each cooling section,
wherein the FCFU is configured to receive vapor from the manifold and to pass the vapor through the condenser sections sequentially to fractionally condense the vapor and produce distilled water and chemicals,
wherein the condensate drains are configured to collect distilled water and chemicals,
and wherein the distilled water is transported to a holding tank for reuse as a fracturing fluid and the chemicals are recovered for reuse.

2. The hydraulic fracturing system of claim 1 wherein: The plurality of cooling tubes providing a flow of coolant.

3. The hydraulic fracturing system of claim 2 wherein: each cooling section contains a temperature probe which is used to determine the proper flow rate of coolant through the cooling tubes.

4. The hydraulic fracturing system of claim 1 further comprising: a variable speed torque converter (VSTC) operatively connected between the engine and the fracturing pump.

5. The hydraulic fracturing system of claim 1 wherein: the engines further accept natural gas from a well head to supplement fuel from the fuel tank.

6. The hydraulic fracturing system of claim 1 further comprising: a preparation and completion unit (PCU) containing a sulfur dioxide gas scrubber accepting natural gas from a well head and directing it to the engines.

7. The hydraulic fracturing system of claim 1 further comprising: a plurality of sand tanks; a sand blender accepting sand from the sand tanks through a sealed sand conveyer and directing it towards the low pressure manifold; a suction fan positioned to create a vacuum within the sand blender; and a filter positioned within the sand blender.

8. A hydraulic fracturing system comprising:
a plurality of fracturing units, each unit comprising:
an engine,
a fracturing pump operatively connected to the engine,
a low pressure inlet operatively connected to the fracturing pump and configured to supply the fracturing pump with fracturing fluid, a high pressure outlet operatively connected to the fracturing pump and configured to receive a pressurized fracturing fluid therefrom, a tube and shell heat exchanger which accepts engine coolant and transfers heat from the engine coolant to the FBW/PW from a well, a water heater which accepts the heated FBW/PW from the tube and shell heat exchanger and adds further heat, an engine exhaust heat exchanger which accepts the heated FBW/FW from the water heater and produces vapor comprising vaporized water and chemicals, a pump which forces water through the heat exchanger and water heater, and an AC generator coupled to the engine and providing power to the water heater and the pump;

a single fuel tank supplying fuel to each of the plurality of engines;

a manifold configured to collect the vapor produced within each fracturing unit, and a Forced Cooling Fractionation Unit (FCFU) comprising
a plurality of condenser sections wherein each condenser section has alternating cooling section and rising section and a condensate drain positioned at the bottom of each cooling section, wherein the FCFU is configured to receive vapor from the manifold and to pass the vapor through the condenser sections sequentially to fractionally condense the vapor and produce distilled water and chemicals, wherein the condensate drains are configured to collect distilled water and chemicals, and wherein the distilled water is transported to a holding tank for reuse as a fracturing fluid and the chemicals are recovered for reuse.

9. The hydraulic fracturing system of claim 8 wherein: the force cooling fractioning unit (FCFU) contains a single inlet for all of the vaporized water and chemicals collected from the manifold.

10. The hydraulic fracturing system of claim 8 wherein: each fracturing unit is contained within an ISO container.

11. The hydraulic system of claim 10 wherein: the ISO containers containing a-fracturing units are stacked atop each other.

12. The hydraulic fracturing system of claim 11 wherein: the stacked ISO containers containing fracturing units are positioned atop a track system.

13. The hydraulic fracturing system of claim 8 wherein: the engines accept natural gas coming from a well head.

14. The hydraulic fracturing system of claim 8 further comprising: a preparation and completion unit (PCU) containing a sulfur dioxide gas scrubber and a gas compressor, wherein the sulfur dioxide gas scrubber accepts natural gas from a well head and directing it to the engines and wherein the gas compressor accepts natural gas from the scrubber and pressurizes it prior to sending the natural gas to the engines.

15. The hydraulic fracturing system of claim 8 further comprising: a sand blender operatively connected to the low pressure inlet on the fracturing pump; a suction fan positioned within the sand blender; and a filter positioned within a flow of air created by the suction fan.

16. The hydraulic fracturing system of claim 8 wherein: the engines accept natural gas coming from a well head or natural gas from a tanker.

17. A hydraulic fracturing system comprising:
a plurality of fracturing units, each comprising:
an engine,
a Variable Speed Torque Converter (VSTC) operatively connected to the engine,
a fracturing pump operatively connected to the VSTC,
a low pressure inlet operatively connected to the fracturing pump and configured to supply the fracturing pump with fracturing fluid,
a high pressure outlet operatively connected to the fracturing pump and configured to receive a pressurized fracturing fluid therefrom, and
a heat exchanger which accepts exhaust from the engine and transfers heat from the engine exhaust to FBW/PW to produce vapor comprising vaporized water and chemicals,
a single fuel tank supplying fuel to the plurality of the engines,
a manifold configured to collect the vapor produced within each fracturing unit and directs the vaporized water and chemicals into a Forced Cooling Fractionation Unit for condensation, and
the Forced Cooling Fractionation Unit (FCFU) comprising a plurality of condenser sections wherein each condenser section has alternating cooling section and rising section and a condensate drain positioned at the bottom of each cooling section,
wherein the FCFU is configured to receive vapor from the manifold and to pass the vapor through the condenser sections sequentially to fractionally condense the vapor and produce distilled water and chemicals,
wherein the condensate drains are configured to collect distilled water and chemicals,
and wherein the distilled water is transported to a holding tank for reuse as a fracturing fluid and the chemicals are recovered for reuse.

18. The hydraulic fracturing system of claim 17 further comprising: a plurality of sand tanks; a sand blender accepting sand from the sand tanks through a sealed sand conveyer and directing it towards the low pressure inlet of each fracturing pump; and a filter positioned within the sand blender to remove airborne particulate, including but not limited to silica dust.

* * * * *